United States Patent Office 3,241,769
Patented Mar. 22, 1966

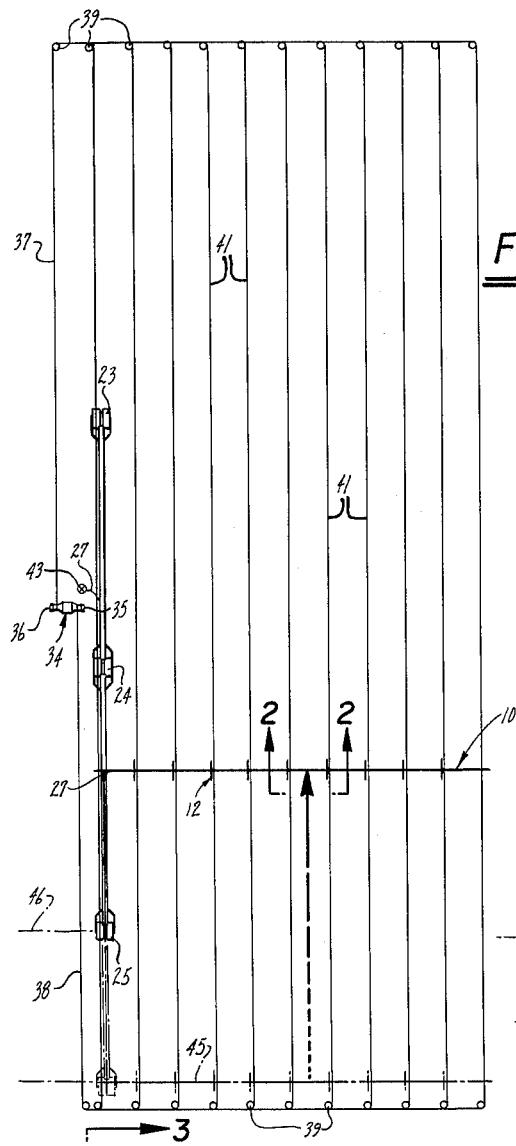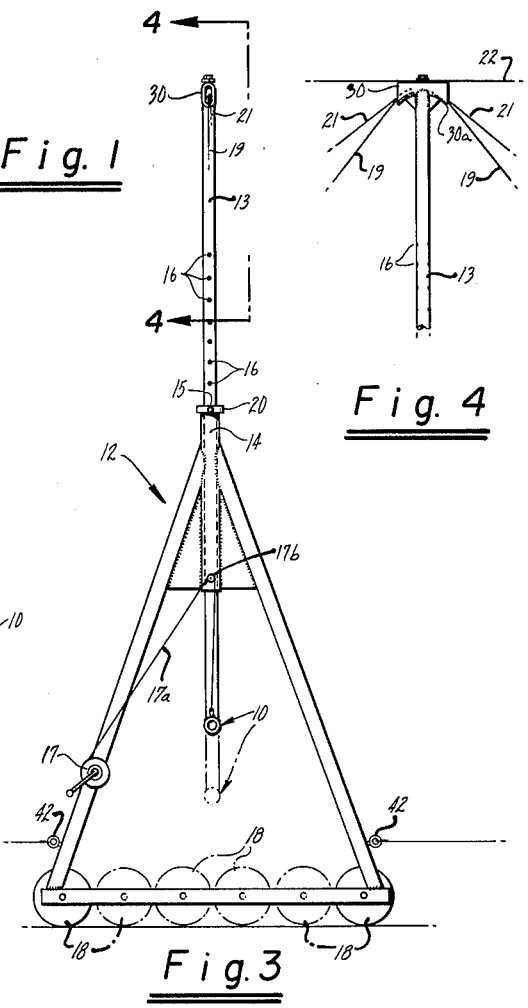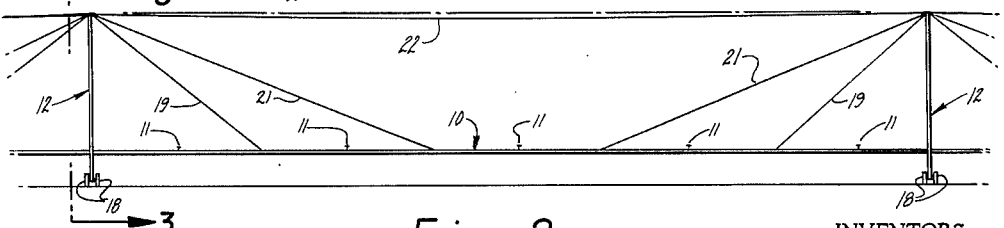

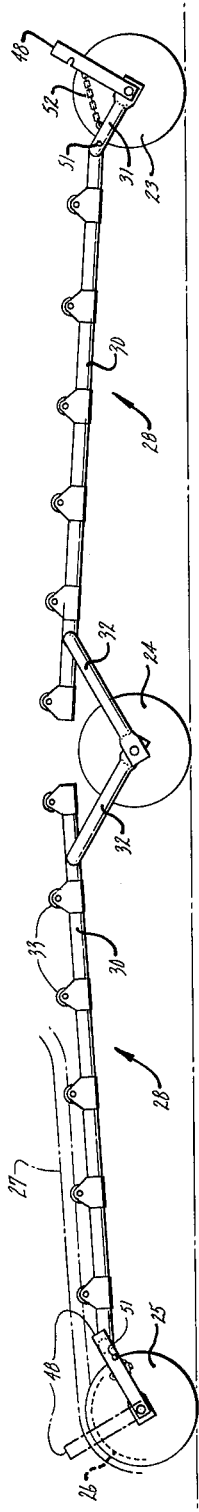
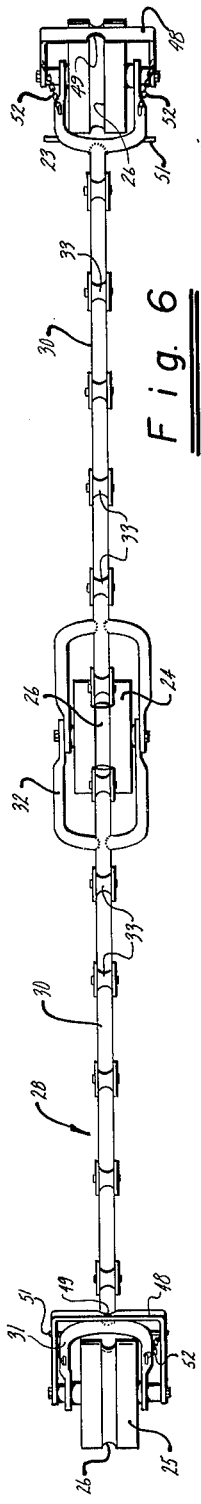
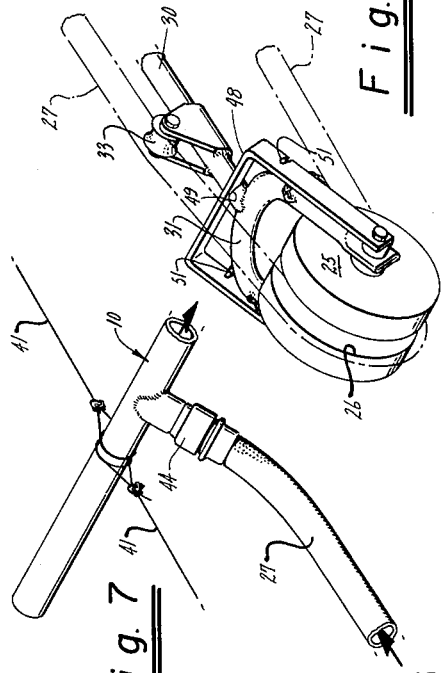

3,241,769
LOW PRESSURE SPRINKLING SYSTEM
Fred B. Allen, 1989 Ottawa Drive, Las Vegas, Nev., and Edwin H. Mankinen, Box 277, Lathrop Wells, Nev.
Filed July 17, 1963, Ser. No. 295,693
8 Claims. (Cl. 239—183)

This invention relates to a sprinkling system for watering crops and more particularly to an improved mobile system for same.

It has been well known for a considerable number of years that watering crops by sprinkling is best done at relatively low water pressure, on the order of 5 to 12 pounds, for example. This can be effected by positioning a sprinkling lateral across the field to be watered and supplying water from a hydrant to the lateral. However, in the past, utilizing pressures as low as those mentioned would require the sprinkling lateral to be repositioned many times to complete the field. In short, the range of the sprinkling heads is rather limited at these low pressures. To require the sprinkling lateral to be repositioned many times obviously results in a correspondingly large labor expense. Accordingly, in order to minimize labor costs, pressures have been increased so as to increase the range of the sprinkling heads. At the same time as the pressure is increased, however, attendant costs involved in creating a higher water pressure likewise increase to a point where, at something on the order of 60 pounds, any saving in labor cost is offset by the expense of increasing the water pressure. Furthermore, as water pressure is increased, evaporation losses to the atmosphere likewise increase due to causes which are well known. Accordingly, it has been recognized for some considerable period that a mobile sprinkling lateral operating at low pressure is most desirable.

It is a general object of the present invention, therefore, to provide an improved mobile sprinkling system for watering crops.

Recognizing that a mobile sprinkling system for watering agricultural crops would provide the advantages noted, such sprinkling systems have previously been attempted but with only limited or marginal success. A major obstacle to successful mobilized operation has repeatedly been found in providing a flexible interconnection between the water supply hydrant and the traveling lateral. Use of a flexible hose, while seemingly an obvious expedient, has posed sufficient problems in the watering of agricultural crops (where relatively large diameter hoses need to be employed) that a number of unwieldy and economically impractical schemes have been proposed and attempted.

In one scheme, for example, the sprinkling lateral is connected at one end to the water supply on a swivel fixed in the center of a circle while the other end travels a circular path. Any number of problems are involved in a scheme of this kind, not the least of which is supplied by the speed differential of different points along the sprinkling line for which elaborate compensation must be made. Another arrangement, having rather obvious disadvantages, employs a telescoping water supply pipe.

In the area of flexible hose connections for supplying the water to the sprinkling lateral, one scheme employs a hose supported on rollers or casters which attempt to alleviate the frictional drag of the hose along the ground. A major problem with such an arrangement as this is found where the hose turns back upon itself. At this point the rollers or casters fail to function and can cause the drag to be increased.

In the light of the foregoing it will be readily apparent that significant manual handling of a water-laden hose for agricultural purposes is economically impractical.

It is therefore another object of the invention to provide an improved mobilized sprinkling system employing an economy of equipment and requiring a minimum of manual attention.

A still further object of the invention is to provide a mobilized sprinkling system capable of normal operation over extended periods of time without personal attention and for dispensing low water pressures on the order of 5 to 12 pounds per square inch.

A more particular object of the invention is to provide a method and means for handling a flexible water supply line interconnecting a fixed source of water supply to a traveling sprinkling lateral.

Another object of the invention is the provision of a mobilized sprinkling system which can be disassembled and shipped with a minimum bulk.

These and other objects will be more clearly apparent from the following description of the preferred embodiment of the invention wherein:

FIGURE 1 is a schematic layout showing a field being watered according to the system.

FIGURE 2 is a front elevation view of the portion of FIGURE 1 taken along line 2—2 thereof.

FIGURE 3 is a side elevation view of a support tower.

FIGURE 4 is an end view of a portion of FIGURE 3 along the lines 4—4 thereof.

FIGURE 5 is a side elevation view of a hose carrier means.

FIGURE 6 is a plan view of FIGURE 5.

FIGURE 7 is a perspective view of a cable connection and hose connection at one end of the sprinkling lateral.

FIGURE 8 is a perspective detailed view of an alternative embodiment relative to the hose according to the invention.

FIGURE 9 is a perspective detailed view of a portion of the hose carrier means.

FIGURE 10 is a schematic view showing the hose carrying movement of the hose carrier means of FIGURE 5.

The sprinkling system is particularly adapted for use in watering a rectangularly defined field, such as shown in FIGURE 1, from a hydrant disposed at one side thereof substantially midway between the ends. The sprinkling system includes a series of rolling support towers for carrying an elongated header pipe extending between the sides of the field whereby the pipe is adapted to be driven from one end of the field to the other. The header pipe includes sprinkler heads for broadcasting the water dispensed therefrom. Water supply means for feeding water from the hydrant to one end of the pipe includes a length of hose adapted to be laid out on the ground along the side of the field adjacent to the hydrant and is sufficiently long so as to extend from the hydrant to the pipe when the pipe is disposed at one end of the field. Hose carrier means serves to draw the hose back upon itself to form an upper and lower reach thereof. The hose carrier means includes a T-connection attaching the hose to lead perpendicularly away from the pipe at a position a short distance in from one end, and a mobilized carriage. The hose carriage is disposed to move along the side of the field, guided for a substantial portion of its travel along the direction of the lower or return reach of hose and supporting substantially the full weight of the water-laden upper reach. The rolling support towers are laterally spaced and each is connected by cable means to a winch serving to advance the header pipe from one end of the field to the other.

Where large scale agriculture of the kind being described is involved, a significant manpower problem has been involved in manhandling hoses and irrigation pipes in the fields. While many reasons may have contributed to the unsuccessful efforts of prior attempts to mobilize a sprinkling lateral, one significant handicap has been the lack of an efficient means for interconnecting a lateral header pipe with the water supply hydrant in a manner obviating the manhandling of a water-laden large diameter hose. Accordingly, the hose carrier means and method of handling the hose, as provided herein, serves to minimize if not altogether preclude the requirement of dragging the hose, when filled with water, along the ground. The hose carrier means serves to support substantially the entire weight of the upper reach of hose and carry it in its water-laden state in the direction of movement of the header pipe.

The method of handling the flexible water supply line from the hydrant to the mobile sprinkling lateral or header pipe follows the steps of connecting one end of a length of hose to the hydrant, laying the hose out on the ground to run in a generally straight line along the hydrant-side of the field so as to extend in a generally straight line from a position adjacent the hydrant to a position near the starting end of the field, disposing the unattached end of hose around a grooved wheel to lead in the direction of movement of the mobilized sprinkling header, attaching the last named end of hose to the sprinkling header pipe extending laterally of the sides of the field, pulling the header-end of the hose in the direction of movement of the sprinkling header as it progresses across the field in a direction generally parallel to the straight line thereby forming an upper and lower or return reach of hose while advancing the grooved wheel, and supporting, during the pulling step, substantially the entire weight of the upper reach of hose on a framework carried by the grooved wheel and another disposed in advance thereof. When the header end of hose and header pipe have reached the opposite end of the field, both ends of the hose are disconnected.

Where the next adjacent field is provided with an irrigation hydrant disposed substantially midway between the ends thereof, in a manner corresponding to the previously watered field, the hose is further handled by the steps of holding the now unattached header end of hose below the upper reach while manually continuing the advancing movement of the wheel-supported carriage until the first named wheel has been carried sufficiently beyond a position adjacent the unattached header-end of hose to permit the same to be disposed around the first named wheel and reconnected to the header pipe, whereupon the hydrant end of hose is connected to the last named hydrant and the next move is performed according to the steps of the preceding move.

With particular reference to FIGURE 1, a header pipe of substantial diameter on the order of 4″–6″ is schematically represented by the reference numeral 10. Sprinkling heads 11 are carried by pipe 10 for broadcasting water onto the field at a controlled height therefrom at low pressures. Means are provided for the cable suspension of the header pipe at a selected height above the ground on wheels free to follow irregularities of terrain and make limited changes in direction of movement with respect to the direction of movement of the pipe. A series of laterally spaced mobile support towers 12 serve to carry header pipe 10. Towers 12 include a framework mounted on wheels 18 and supporting an upright sleeve member 14. A mast 13 is vertically movable in sleeve member 14 to any one of several selected positions defined by holes 16 therein. A pin 15 removably carried in a collar 20 serves to lock collar 20 to mast 13 at a selected position. Collar 20 rides freely on the upper end of sleeve member 14 to permit relative rotational movement therebetween. A hand winch 17 and cable 17a are connected via a pulley 17b to raise mast 13 for any particular tower 12.

Means are provided for laterally spacing the towers 12 one from the other, as well as for supporting the pipe 10 at intermediate points between adjacent towers. The means for spacing the towers from each other further serves to accommodate lateral rocking movement at the top of each mast caused by uneven terrain irregularities.

Thus the rigging shown in FIGURE 2 includes a pair of stays 19, 21 extending to each side of the top of each mast 13 and fastened to pipe 10 at different intermediate distances therefrom. A tubular cable guide member 30 having a guiding lower lip 30a is carried at the top of each mast. Stays 19, 21 extend freely through member 30 so that stays 19, 21 can be of a fixed length and tensioned in any suitable manner as by turnbuckles.

A mast-top spacing cable 22 serves to maintain proper spacing between the tops of masts 13 and is coupled to member 30. The catenary formed in cable 22 varies with the lateral rocking of the masts.

Means for supporting a water-laden hose for advancing movement along the field is provided as shown in FIGURES 5 through 7. The hose carrying means includes a framework supported by a plurality of wheels 23, 24 and 25 of generally identical construction. Each of the wheels is mounted to rotate on a separate spaced axle disposed parallel to the ends of the field when in operation. Each of the wheels includes a groove 26 peripherally around the tread portion and is sufficiently deep and wide so as to be adapted to follow the return reach of a supply hose 27 laid out along the ground at the side. The grooves are aligned in a single plane extending upwardly so that one groove follows the next. A framework-style carriage 28 is supported to extend between each adjacent pair of wheels. The carriages 28 are pivotally connected in tandem by pivotally supporting adjacent ends upon the axle of wheel 24. Each carriage 28 includes a length 30 of pipe having a yoke 31, 32 at each end. Yokes 32 depend downwardly at a steeper angle than yokes 31 and are arranged to dispose their adjacent ends of the carriage higher than at yokes 31. Means for supporting an upper reach of hose includes a series of rollers 33 supported in brackets as best shown in FIGURE 9 welded to the length of pipe 30. Thus, there is provided a hose guiding and supporting portion defining a trough. As shown in FIGURE 8, actual troughs can be employed although the roller-defined trough is preferred, due to the larger diameter hose sizes. As will be more fully described below, at the end of a run nearly the entire length of hose is resting on the carrier. Thus, the raised midpoint in the region of wheel 24 serves to provide means for readily draining the hose at the end of each run by disconnecting each end.

As shown in FIGURE 1, the hose carrier means extends a substantial proportionate length along the side of the field being watered. For example, where a field of a length of 120 feet is employed a suitable hose carrier means may extend on the order of thirty to sixty feet, i.e., roughly one-quarter to one-half the length of the field. Of course, the entire acreage ultimately to be watered may be much greater. In this event, subdividing the acreage into parcels of the size suggested may be preferred although the carrier can be made quite long if desired. Due to the over-all length of the hose carrier means, if a unitary rigid frame were employed, ridges in the field might tend to drag the intermediate portion of the frame on the terrain and add an additional strain to the hose. Accordingly, the framework is hingedly linked to extend from both sides of the intermediate wheel 24. For some smaller scale operations on very level land, two-wheeled support may be sufficient.

Means for driving the entire system along the field are provided by a winch 34 having a cable supply capstan 35 at one end and a take-up capstan 36 at the other. A quarter inch driving cable 37 is reeled in as a similar cable 38 is payed out. A five to ten pound drag, as by a friction brake, applied to capstan 35 serves to maintain a true movement of towers 12.

At each end of the field a number of pulleys 39 are staked into the ground or otherwise anchored. A number of eight inch cables 41 are trained around pulleys 39 and lead to towers 12 at one end. Cables 41 are suitably attached to each end of towers 12 as by pad-eyes 42. The other end of each cable 41 is connected to driving cable 37, as by a harness tug or other connection. A cable station is also formed (FIGURE 7) at each end of the header pipe inasmuch as the ends are supported without benefit of an adjacent tower.

Thus power from winch 34 is supplied through a single driving cable 37 and cables 41 to draw towers 12 and pipe 10 from one end of the field to the other. A preferred speed for watering at the above low pressures has been found to be on the order of 10 feet per hour. If desired, the corner pulleys can be positioned somewhat beyond the ends of the field so as to provide separation of cables 41.

In order to feed water from a hydrant 43 located substantially midway between the ends of the field, a return reach of hose 27 is laid out along the ground on one side of the field. With pipe 10 at the start of a run (for example, at the lower end of the field as shown in FIGURE 1), hose 27 is trained upwardly around wheel 25 and connected to one end of pipe 10 whereby movement of pipe 10 applies a forward drive to the rear wheel. The T-connection 44 serves to support the end so connected so as to apply a direct "pull" upon hose 27. Thus as pipe 10 is advanced along the field, hose 27 will be pulled increasingly onto and along the top side of the hose carrier to form an upper reach thereof. Meanwhile the lower or return reach of hose 27 serves to guide the carrier along the field. Toward the tail end of the run the lower or return reach will become substantially exhausted and nearly all the hose will be on the carrier. By that time, however, further guidance will no longer be necessary.

It will be apparent that the advancing movement of the hose carrier is at half the speed of the advancing pipe 10, as shown by the displacement between lines 45 and 46. When pipe 10 has reached the far end of the field, the trailing wheel 25 of the hose carrier will have reached the midpoint of the field and the leading wheel 23 will have fallen behind the pipe only a short distance, thereby forming a short catenary of water-laden hose. Accordingly, the catenary can be varied where the hose carrier means is further extended or additional similar carriers are added in tandem.

After having completed the watering of the field the system is in position to water the next adjacent portion of terrain using the same hose, where the next parcel has been previously provided with a hydrant. Both ends of hose 27 are disconnected. The header end is led beneath the carrier. The carrier is then manually rolled forward until the hydrant end of the hose has been carried up to a position adjacent the "new" hydrant. It is then connected and the run commenced. One man can operate the system including the hose manipulations noted.

Should it be desired to return pipe 10 to its original position designated by line 45, this can be easily accomplished by connecting a cable to the hose carrier means at the previously designated trailing end thereof such as by attaching a bridle to the axle of wheel 25 and rewinding the system to its original position. In the event the carrier is being returned a distance greater than a single parcel or if it is desired to leave the hose on top of the carrier, means are provided for holding the upper reach of hose out of contact with the wheels during such return trips. Thus, a U-shaped bail 48 is pivotally carried on the axles of wheels 23, 25. A notched portion 49 is adapted to receive the frame and lie out of the way against studs 51 at the sides of yokes 31. On the return trip, bails 48 are raised up to a position limited by chains 52 extending between yoke 31 and bail 48.

It will be evident from the foregoing that the system permits rather large diameter hoses to be connected to an equally large diameter header pipe lateral whereby low pressure water can be fed for application to a field. Furthermore, the minimal labor involved in handling the system provides an extremely low cost operation. Finally, the entire system can be knocked down and transported to a new region rather simply with a minimum of hauling expense.

We claim:

1. In a sprinkling system for watering a rectangularly defined field, apparatus comprising an elongated mobile header pipe extending between the sides of the defined field, sprinkler heads carried by the pipe and fed therefrom, means for advancing the pipe in a given direction from one end of the field to the other, a mobile hose carrier including a frame and ground engaging support means for supporting the frame for movement over the terrain, a flexible hose having two ends, hose coupling means for attaching one end of the hose to the pipe, said hose coupling means supporting the hose to extend away from the pipe in a direction opposite to said direction of pipe advance, said hose thereafter looping downwardly around one of said ground engaging support means of the hose carrier means and forming a return reach extending in the direction of pipe advance from said one ground engaging means, means at the other end of the hose adapted to be coupled to a hydrant, that length of said return reach of said hose between said one ground engaging support means of the carrier and said other end of the hose connected to said hydrant being supported primarily by ground engagement thereof, and means on said frame for supporting off the ground substantially the full length of that reach of hose between the first named hose coupling means and said one ground engaging support means of the hose carrier when said pipe is advancing from one end of the field to the other whereby frictional drag on said header pipe is minimized.

2. Sprinkling system apparatus according to claim 1 wherein the ground engaging support means includes means further cooperatively engaging said ground supported return reach of said hose for guiding said carrier means therealong during advancing movement of said pipe.

3. Sprinkling system apparatus according to claim 1 wherein said ground engaging support means comprises a pair of wheels having ground engaging tread portions, said wheels being mounted to rotate on separate axles spaced in the direction of the advancing movement of the pipe, each of said wheels having a groove formed in the tread portion thereof to embrace the hose along said ground supported return reach thereof and follow same, one of the wheels trailing the other, said frame being supported by said axles and extending therebetween, said hose supporting means defining a trough to receive and support the last named reach at spaced intervals therealong.

4. Sprinkling system apparatus according to claim 1 wherein said hose carrier means comprises a plurality of three wheels mounted to rotate on separate axles adapted to be disposed parallel to the ends of the field and spaced in a line extending in the direction of the advancing movement of the pipe, each of said wheels having a ground engaging tread portion and a groove in the tread portion extending around the wheel, said groove being dimensioned to embrace said hose along the ground supported return reach thereof, said grooves being aligned in a single plane extending upwardly through same, said frame being supported by said axles and extending therebetween, said frame including a plurality of rollers defining a trough to engage and support the second named reach at spaced intervals therealong, the longitudinal midpoint of said trough being raised above the ends to cause water to drain toward the ends of the hose when decoupled at the ends thereof.

5. Sprinkling apparatus as defined in claim 4 wherein the intermediate wheel is free to move vertically with respect to a plane defined by the axles of the other two wheels thereby accommodating terrain irregularities.

6. A mobile sprinkling system adapted to water a rectangularly defined field from a hydrant disposed adjacent one side thereof substantially midway between the ends, said system comprising an elongated header pipe extending between the sides of the field and adapted to be driven from one end of the field to the other, a series of sprinkler heads spaced along the length of the header pipe and supported therefrom for broadcasting water onto said field, pipe support means serving to carry said pipe from one end of the field to the other while broadcasting water from said sprinkler heads, drive means for moving said pipe support means from one end of the field to the other, a length of hose adapted to be coupled to the hydrant and further adapted to be laid out on the ground along the first named side of the field, the length of said hose being sufficient to extend to the pipe when the pipe is disposed at one end of the field, hose connection means coupling the hose to the pipe at one end thereof, means for driving the pipe to move same to the other end of the field and draw an end of the hose therewith, and mobile hose carrying means adapted to move along the last named side of the field and having means supporting substantially the entire remaining portion of the hose, said hose being trained about a portion of the carrier means to advance said carrier means toward the other end of the field upon advancing movement of the pipe.

7. Sprinkling apparatus as defined in claim 2 further including a pair of bail-shaped members pivotally carried respectively at each end of the hose carrier means, one of said wheels being disposed at each end of said carrier means, each said bail member having a hose engaging portion extending transversely of the second named reach of said hose, said hose engaging portions being pivotally movable from a normal position lying beneath said second named reach to a raised position disposed to carry the hose out of contact with that wheel disposed at that end of the carrier means.

8. Sprinkling system apparatus according to claim 3 wherein said trough includes rollers defining same, and said trough extends sufficiently along the side of the field to rollably support substantially all the weight of that entire length of said hose which is in motion during advancing movement of the pipe.

References Cited by the Examiner

UNITED STATES PATENTS

| | | | |
|---|---|---|---|
| 887,911 | 5/1908 | Bevill | 239—184 |
| 1,159,658 | 11/1915 | Ellis | 239—184 |
| 1,387,256 | 8/1921 | Griffin | 239—188 |
| 1,943,152 | 1/1934 | Weiss | 239—1 |
| 2,122,596 | 7/1938 | Turner | 239—189 |
| 2,392,408 | 1/1946 | Radonich | 239—1 |
| 2,554,513 | 5/1951 | Ward | 239—186 |
| 2,941,727 | 6/1960 | Zybach | 239—212 |
| 3,094,282 | 6/1963 | Purtell | 239—213 |

M. HENSON WOOD, JR., *Primary Examiner.*

EVERETT W. KIRBY, *Examiner.*